US008578333B2

(12) United States Patent  (10) Patent No.: US 8,578,333 B2
Sivadas et al.  (45) Date of Patent: Nov. 5, 2013

(54) METHOD AND SYSTEM FOR CLIENT-SIDE USER INTERFACE ENHANCEMENT TO ENABLE APPLICATION INTEGRATION AND PORTALISATION

(75) Inventors: Madhav Sivadas, Singapore (SG); Shiva Kumar Madhavan, Singapore (SG); Balaraman Kunduvara, Singapore (SG)

(73) Assignee: Exilant Pte Ltd., Singapore (SG)

( * ) Notice: Subject to any disclaimer, the term of this patent is extended or adjusted under 35 U.S.C. 154(b) by 1070 days.

(21) Appl. No.: 12/305,949

(22) PCT Filed: Jun. 27, 2007

(86) PCT No.: PCT/SG2007/000184
§ 371 (c)(1),
(2), (4) Date: Dec. 19, 2008

(87) PCT Pub. No.: WO2008/002274
PCT Pub. Date: Jan. 3, 2008

(65) Prior Publication Data
US 2010/0218084 A1  Aug. 26, 2010

Related U.S. Application Data

(60) Provisional application No. 60/817,008, filed on Jun. 27, 2006.

(51) Int. Cl.
*G06F 9/44*  (2006.01)
(52) U.S. Cl.
USPC ........... 717/121; 717/102; 717/109; 715/740; 715/771

(58) Field of Classification Search
USPC .......... 717/100–122, 146, 124; 715/234, 771, 715/740
See application file for complete search history.

(56) References Cited

U.S. PATENT DOCUMENTS

| 2002/0144233 | A1* | 10/2002 | Chong et al. | 717/105 |
|---|---|---|---|---|
| 2002/0184610 | A1* | 12/2002 | Chong et al. | 717/109 |
| 2002/0199182 | A1* | 12/2002 | Whitehead | 725/1 |
| 2003/0172368 | A1* | 9/2003 | Alumbaugh et al. | 717/106 |
| 2003/0208743 | A1* | 11/2003 | Chong et al. | 717/106 |

(Continued)

FOREIGN PATENT DOCUMENTS

WO  WO 02/065360  8/2002
WO  WO 03/083600  10/2003

OTHER PUBLICATIONS

Rahat Iqbal et al., A framework for interoperability of heterogeneous systems—Database and Expert Systems Applications, 2003. Proceedings. 14th International Workshop, pp. 1-5.*
International Search Report, International Application No. PCT/SG2007/000184, Aug. 28, 2007, 3 pp.

(Continued)

*Primary Examiner* — Lewis A Bullock, Jr.
*Assistant Examiner* — Tina Huynh
(74) *Attorney, Agent, or Firm* — Haynes and Boone LLP (57) ABSTRACT

A system for integrating and interoperating multiple heterogeneous applications, the system comprising: an Integrated Development Environment (IDE) to enable human users to define the integration and interoperation points of the multiple applications; a configuration file format based on which the IDE generates specific configuration instances; and a runtime engine that understands configuration files adhering to the file format and performs the necessary integration and interoperation actions on the various constituent applications that have been referred to in the configuration file.

28 Claims, 11 Drawing Sheets

(56) References Cited

U.S. PATENT DOCUMENTS

| | | | |
|---|---|---|---|
| 2004/0068714 A1* | 4/2004 | Deimel et al. | 717/101 |
| 2004/0177335 A1 | 9/2004 | Beisiegel et al. | |
| 2005/0223392 A1* | 10/2005 | Cox et al. | 719/328 |
| 2008/0120600 A1* | 5/2008 | Deimel et al. | 717/121 |

OTHER PUBLICATIONS

Written Opinion of the International Searching Authority, International Application No. PCT/SG2007/000184, Aug. 28, 2007, 4 pp.

* cited by examiner

```
LEVEL_ZERO_PORTLET - a web portlet containing portal level aspects.
WIN_LOCAL  - a windows portlet representing windows applications. Aspects that are to be applied on a windows applications applied on this portlet.
WIN_REMOTE - a windows portlet representing applications executed on a remote machine.
<id_of_portlet>:{
    resource_type:"WEB_URL",
    resource:{
        url:<intitial_url_of_resource>,
        name:<descriptive_name_of_portlet>,
        id:<id_of_portlet>,
        identification:{
            <url_of_resource>: {
                "M1": {
                    markers: [
                        <identification_string_1>,
                        <identification_string_2>
                    ],
                    container: <id_of_portlet>,
                    configUrl: <url_to_config_file>
                },
                "M2": {
                    .....
                }
            }
            markerGroups: ["M1","M2"]
        }
    }
},
<id_of_portlet>:{
    resource_type:"WIN_LOCAL" | "WIN_REMOTE",
    resource:{
        url:<intitial_url_of_resource>,
        name:<descriptive_name_of_portlet>,
        id:<id_of_portlet>,
        identification:{
            <url_of_resource>: {
                "M1": {
                    markers: [
                        <identification_string_1>,
                        <identification_string_2>
                    ],
                    container: <id_of_portlet>,
                    configUrl: <url_to_config_file>
                },
                "M2": {
                    .....
                }
            }
            markerGroups: ["M1","M2"]
        }
    },
    hostIp:"127.0.0.1",
    hostPort:"9088",
    title:<title_of_initial_application_window>,
    baseConf:<application_specific_configuration>
}
```

FIG. 4A

```
portlets:[<portlet_1>,<portlet_2>],
layout:{
  style:<layout_type>,
  definition:<layout_specific_configuration>
},
"portlet_1":{
                    prefs:<portlet_specific_layout_data_as_object>
},
"portlet_2":{
  .....
}
}
```
→ 450

FIG. 4B

```
/* File format of configuration to be applied on a portlet*/
/*=========================================*/
aspects:[ point_cuts:[

<POINTCUT_KEY_1>:<POINTCUT_VALUE_1>,
    <POINTCUT_KEY_2>:<POINTCUT_VALUE_2>,

],
  advices:[ bind_to:<POINTCUT_KEY_1>
    advice_object:<OBJECT_NAME>
    advice_method:<METHOD_NAME>
    advice_msg:<ARGUMENTS_IN_OBJECT_FORM>

METHOD AND SYSTEM FOR CLIENT-SIDE USER INTERFACE ENHANCEMENT TO ENABLE APPLICATION INTEGRATION AND PORTALISATION

TECHNICAL FIELD

The invention concerns a method and system for client-side user interface enhancement to enable application integration and portalisation. This invention relates to the integration and interoperation of multiple heterogeneous applications at the client browser end and to the enablement of orchestration of data and events between the applications.

BACKGROUND OF THE INVENTION

Enterprise application integration (EAI) deals with the methods and techniques for unifying disparate applications at the back-end in order to facilitate the provision of enhanced composite applications that provide richer functionality and better abstraction that what was available before. The effort to achieve EAI is relatively large. Such initiatives also require much financial sponsorship and implementation time. This is because of the far reaching impact of modifying and re-engineering legacy applications and back-end systems.

The problem of application integration is compounded when heterogeneous applications require to be integrated. This is because the underlying implementation technologies of the individual applications can be very disparate, thereby causing the integration process to be complex and time-consuming.

Service Oriented Architectures (SOA) is the current methodology that the information technology (IT) industry believes will help in defining a systematic approach to total enterprise application integration. This is because SOA not only provides an architecture philosophy, but it also covers non-technical/management issues concerning EAI. Governance, cost analysis, and project management are some of the non-technical issues that are addressed in a proper SOA based enterprise system.

Over the long term SOA promises dramatic improvements such as cycle time reduction, ultimate levels of reuse, and proper management of back end enterprise software services. However, its effects are visible mostly over a period spanning a few years. In general, SOA is not a short term solution. It is also common that end users and business sponsors do not see visible benefits of adopting SOA in the short term.

Hence there is a need for a system that integrates and interoperates heterogeneous applications without requiring changes to the application code or design, thereby reducing the time-to-market of the integrated system. The reduction in time would enable businesses to operate more efficiently. Reuse of existing applications without making changes to the code or design helps businesses in maximizing the use of their existing software assets.

SUMMARY

According to an aspect of the present invention, a method and system of integrating and interoperating multiple heterogeneous applications is provided comprising: an Integrated Development Environment (IDE) to enable human users to define the integration and interoperation points of the multiple applications; a configuration file format based on which the IDE generates specific configuration instances; and a runtime engine that understands configuration files adhering to the file format and performs the necessary integration and interoperation actions on the various constituent applications that have been referred to in the configuration file.

An embodiment of the invention provides an IDE that enables users to specify the various actions on web pages or screens that need to be integrated. The IDE provides a visual interface for users to define the layout of the integrated portal; identify specific pages and screens that need to be altered; specify the type of alterations to be made on each of the pages; specify drag-and-drop actions; specify automatic orchestration of actions between the pages.

According to an aspect of the invention a file format is provided for representing the configuration information that is created by the IDE as a result of the user's aforesaid interaction with it. The file format specifies the minimum information that is needed by the runtime engine to accurately perform transformations on the application screens and Web pages.

According to an aspect of the invention a runtime engine is provided that reads configuration files adhering to the aforementioned configuration file format; creates the integrated portal application as specified in the file; and performs the specified transformations on the application screens and Web pages, all in real-time.

An embodiment of the invention provides a runtime engine that can activated via a URL. Once activated, it resides in-memory of the web browser and reads the configuration data from the specified file. It then performs all the actions and orchestrations that are specified in the configuration file.

According to an aspect of the invention, a desktop agent application is provided that listens to requests from the runtime engine and performs actions on a targeted non-web based application that is currently running on the computer. The desktop agent also contains a mechanism to listen to activities on the target application and sends appropriate signals back to the runtime engine.

An embodiment of the invention provides a MICROSOFT WINDOWS desktop agent that runs on a computer based on MICROSOFT WINDOWS operating system. This desktop agent receives messages from the target application by injecting a special module called a "hook" into the execution environment of the application. MICROSOFT WINDOWS hook is a mechanism provided by Microsoft for intercepting messages to the user interface (UI) of any running application that makes use of Microsoft's UI technology. The desktop agent sends messages to the target application by making calls to Microsoft's WIN32 Application Programming Interface (API) functions. MICROSOFT, WINDOWS, AND WIN32 are trade marks of Microsoft Corporation, Redmond, Wash., United States of America.

According to an aspect of the invention, a protocol is provided that enables the runtime engine to communicate with applications via the desktop agents that execute on remote computers on a network.

An embodiment of the invention provides the ability to communicate and integrate with applications that are running on a CITRIX Presentation Server desktop. CITRIX is a trade mark of Citrix Systems Inc., Ft. Lauderdale, Fla., United States of America. CITRIX enables Windows applications to execute on a central "farm of servers" and the graphical interfaces or graphical user interface (GUI) to these applications are made available to remote computers.

An embodiment of the present invention provides an enterprise Single Sign On engine that is capable of storing user credentials (for example, username, password, and other custom data), automatically retrieving these values when needed, propagating the data into the authentication screens or pages of the target applications, and submitting the authentication request.

Further, a method of operation of the runtime is provided in accordance with an embodiment of the invention. The method comprises: parsing the configuration file; creating the portal page; using the configuration data to detect and intercept specific Web pages as they enter the browser; altering the hyper-text mark-up language (HTML) contents of the pages according to the specifications in the configuration file; sending the altered HTML to the browser for visual rendering.

To integrate non-web applications, a method of operation of the runtime is provided. The method comprises parsing the configuration file, launching the non-Web applications, using the configuration data to navigate to appropriate screens, performing orchestration actions on the screens.

According to an aspect of the invention computer program product comprises a computer usable medium for integrating and interoperating multiple heterogeneous applications, the computer usable medium comprising computer readable program code configured to: provide an Integrated Development Environment (IDE) to enable a user to define integration and interoperation points of the multiple applications; provide a configuration file format based on which the IDE generates specific configuration instances; and provide a runtime engine that understands configuration files adhering to the file format and performs the necessary integration and interoperation actions on the various constituent applications that have been referred to in a configuration file.

In this description the terms are to be understood and defined by the general meaning as known in the computer and information technology (IT) industry and in SOA applications. For example:

URL is a Uniform Resource Locator (URL) is a string of characters conforming to a standardized format, which refers to a resource on the Internet (such as a document or an image) by its location.

Portal is a website that aggregates web content from multiple sources and displays the resulting conglomeration in a uniform look and feel.

Portlet is a single unit of content in a portal that can be traced to a particular source. A portal comprises of several portlets. Each portlet contains data from its originating content source.

Portalisation is the (preferably automated) technique of converting content from multiple sources to form part of a portal.

Web browser is the application that displays web content on users' computer terminals.

Web application is any application, whose user interface is rendered through a web browser.

Desktop application is any non-web application that is installed on the user's computer.

Desktop is a graphical user interface (GUI) environment that provides users with a visual area on the screen/display that resembles a physical desktop. Multiple applications can be launched on this visual desktop. The desktop environment provides users the facility to perform actions such as minimizing, maximizing, and arrangement of the visual interfaces of the applications on the desktop. A desktop typically provides icons, windows, toolbars, folders, wallpapers, and abilities like drag and drop.

Desktop session is a logical separation of a given user's current session on multi-user server grade computer systems that are capable of executing multiple desktops concurrently. A desktop session is used to differentiate between each of the multiple desktops that can be activated on such multi-user computer systems.

Remote desktop is a technology and mechanism provided by vendors such as Citrix in which a user can initiate a desktop session on a remote computer system.

Integration is the technique translating the data and commands of one application to that of another. In contrast with "portalisation", which further transforms the appearance of the unified applications to have a common look and feel visually, the process of integration does not have to provide common visual appearance.

Interoperation is the movement of data and events between independent applications or pages.

Orchestration is an arrangement of interoperation units that can be chained to form a higher level flow.

Integrated Development Environment (IDE) is a graphical-user-interface (GUI) application that enables software developers to perform a range of tasks using visual mechanisms.

Runtime is a part of a software application that executes in real time to perform tasks. This term is used in a relative sense. For example the software component in this invention has a runtime and an IDE. Here the IDE is considered as a tool that does not require being present all the time for the main component to work. However, relative to the IDE, there is a runtime present inside the IDE that makes it perform tasks.

HTML is hypertext markup language. The mechanism of encoding content of web sites in a manner that Web browsers can interpret them, and display the data visually as desired.

Heterogeneous Web applications are disparate web applications that have independent existence and have (in many cases) been developed using a wide variety of technologies such as active server pages (ASP), .NET, Java 2 platform enterprise edition (J2EE), PHP: hypertext preprocessor (PHP), Perl, etc. J2EE is a trade mark of Sun Microsystems, Inc., Santa Clara, Calif., United States of America.

Heterogeneous applications are disparate applications (including web and non-web applications) that have independent existence and have been developed using a wide range of technologies.

BRIEF DESCRIPTION OF THE DRAWINGS

An example of the invention will now be described with reference to the accompanying drawings, in which.

DETAILED DESCRIPTION

Figure 1:
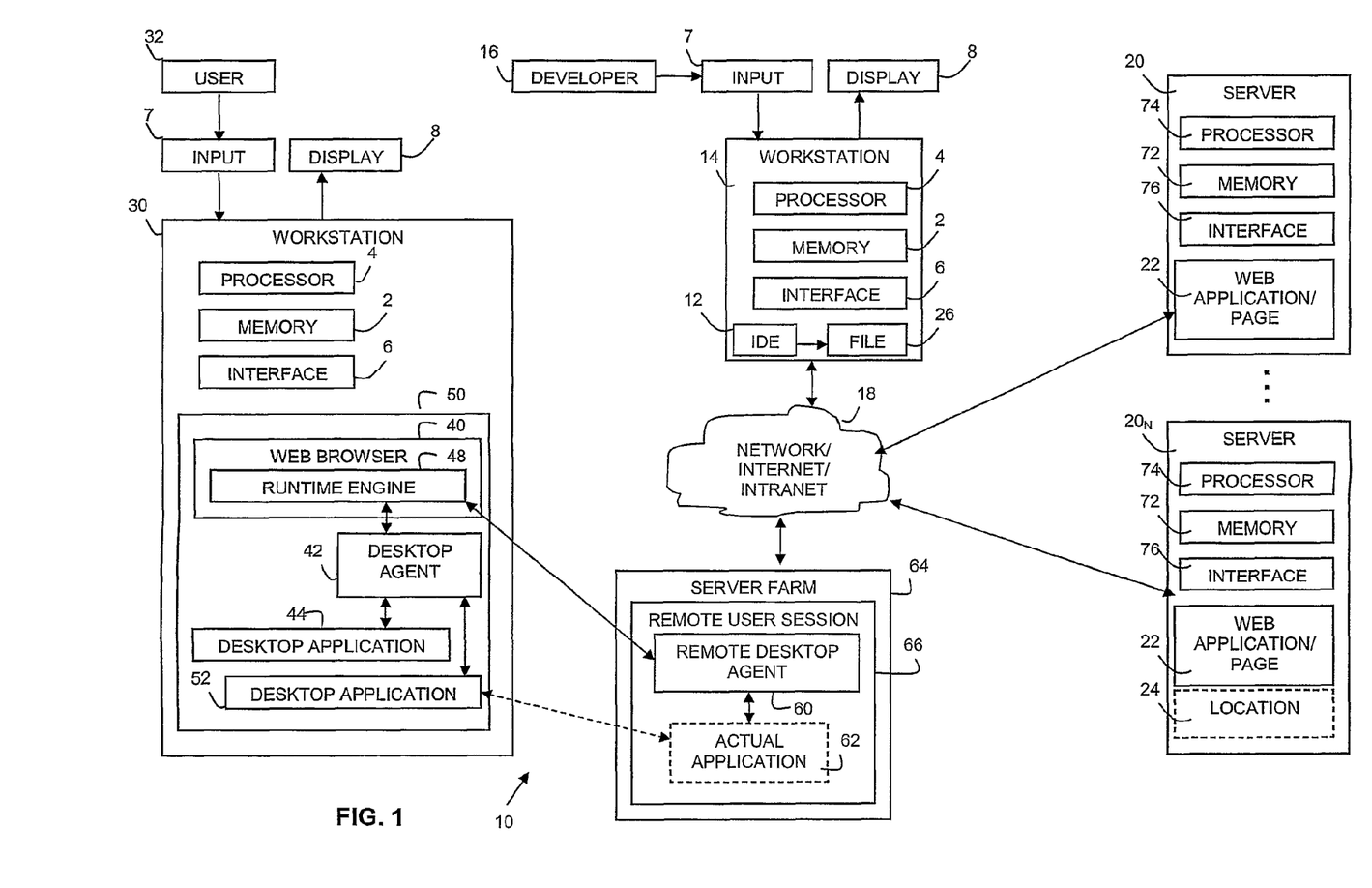
FIG. 1 is a block diagram of the system in accordance with an embodiment of the present invention.
Figure 2:
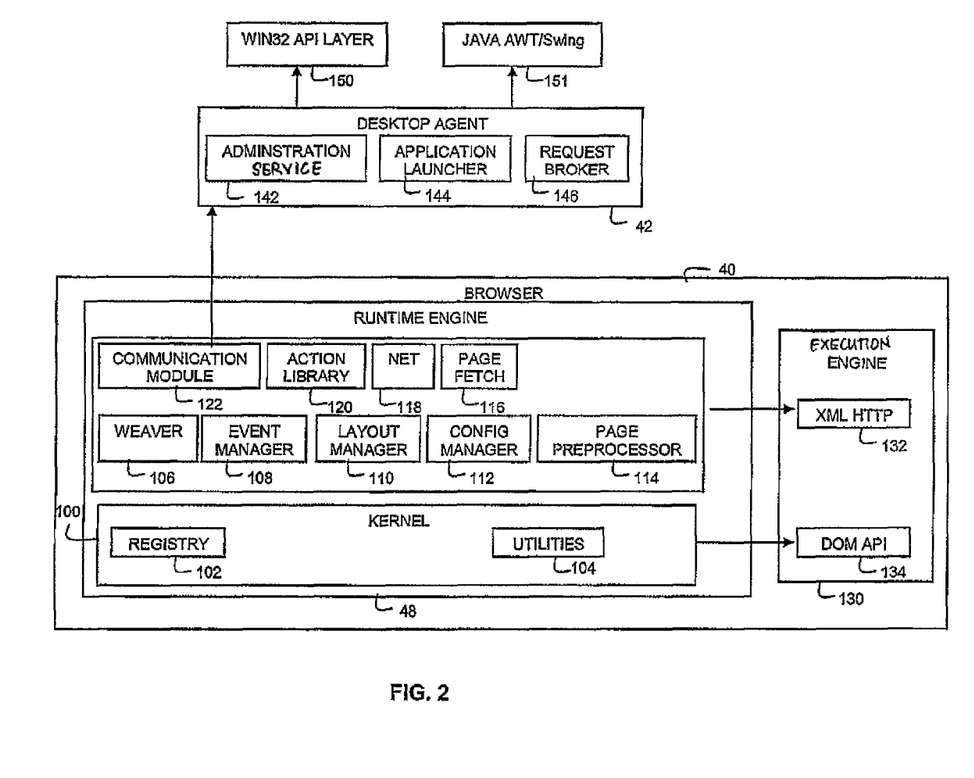
FIG. 2 is a runtime architecture diagram of the system in accordance with an embodiment of the present invention.

FIG. 1 and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, personal digital assistant (PDA) and the like. Generally, program modules include routines, programs, characters, components, and data structures that perform particular tasks or implement particular abstract data types. As those skilled in the art will appreciate, the invention may be practiced with other computer system configurations, including hand-held devices, multiprocessor systems, microprocessor-based or programmable consumer electronics, network personal computers (PC), minicomputers, mainframe computers, and the like. The invention may also be practiced in distributed computing environments where tasks are performed by remote processing devices that are linked through a communications network. In a distributed computing environment, program modules may be located in both local and remote memory storage devices.

The main components of the system 10 are illustrated in FIG. 1 in accordance with an embodiment of the invention. The system generally comprises: an Integrated Development Environment (IDE) 12 that runs on a computer terminal 14 that is used by a developer 16; a configuration file 26 that is generated by the IDE as a result of interactions with the user; and a runtime engine 48 that is loaded into a web browser that displays the integrated portal. The computer terminal 14 or workstation may comprise inter alia a memory 2, processor 4, and interface 6 for interfacing with a network such as the Internet or Intranet 18. An input device 7 and display 8 is provided for a user to interface with the user workstation for inputting and displaying data.

The IDE provides a visual environment for the developer 16 to define the layout of the integrated portal, specify the constituent portlet applications, specify user interface (UI) changes in any of the portlets, and define interoperation actions among the portlets.

The specifications made by the user are converted by the IDE into a configuration file 26 and sent to a remote location specified by the user. This location 24 is within a web server 20 that is reachable via a communications network from the IDE's host machine 14. The web server 20-20$_N$ may comprise a memory 72, processor 74, and an interface 76 inter alia. It will be appreciated that file location 24 may be selected and stored on the server 20 having any number of configurations, for example a single server or multiple servers. The location 24 shown in dashed box may be accessible and centralized to manage on the server 20$_N$ without requiring additional hardware or software to store the configurations. Alternatively the file 26 is stored on the IDE's host machine 14 and is later transferred to a web server by any other means.

Any user 32 who intends to interact with the resulting integrated portal ("integrated portal"), loads the configuration file into a web browser 40 by targeting it to the URL of the configuration file location 24. The web page or web application 22 on the web server 20 is accessible via the network 18 by the runtime engine 48 of the user's web browser 40. It will be appreciated that the user 32 may access the system 10 via a computer terminal workstation 30, the same or similar to computer terminal workstation 14 of the developer 16. Of course, it will be appreciated that the developer 16 may perform the same or all of the functions as described of the user 32 on a single workstation such as workstation 14 and/or workstation 30.

When loaded into the browser 40, the file spawns an instance of a runtime engine 48. Further, this runtime reads the remainder of the configuration data and begins to assemble the integrated portal.

The runtime engine identifies the component portlets and their URL addresses and directs the browser to load these pages 22.

The configuration data 26 could specify one or more desktop applications 44 to be part of the integrated portal. A desktop application could be based purely on Microsoft's Win32 technology or other technologies such as Citrix ICA 52 or Java Abstract Windowing Toolkit (AWT), Java Swing 154 or the like.

If the configuration data 26 specifies a desktop application 44 to be part of the integrated portal, the runtime engine 48 will communicate with a desktop agent component 42 on the user's computer. The desktop agent will launch the appropriate desktop application 44 on the user's computer and establish an internal conduit to relay commands from the runtime engine 48 to the desktop application 44. The desktop agent can connect and communicate with multiple desktop applications concurrently.

If the configuration data 26 specifies a desktop application 154 that is based on Java user interface technologies such as Java Abstract Windowing Toolkit (AWT) or Swing, the desktop agent will launch a modified version the appropriate application on the user's computer. The modification comprises of adding the Java AWT/Swing Adapter 152 into the startup sequence of the application's 154 Java Virtual Machine (JVM). The Java AWT/Swing Adapter listens to commands from the desktop agent and relays commands to the target Java application 154.

If the configuration data 26 specifies a desktop application 52 that is based on a third-party remote desktop technology such as CITRIX, the runtime engine 48 will communicate a special message to the desktop agent component 42 on the user's computer. The desktop agent will launch the desktop application 52 on the user's computer. It will then determine the location of the remote machine 64, and the user desktop 66 on the machine, where the actual application 62 is executing and communicate with that machine's desktop agent 60 in order to establish an internal conduit to relay commands into the application 62. The effect of performing actions on the application 62 can be visibly seen on the application 52 through third party technologies such as CITRIX ICA (Independent Computing Architecture)

In greater detail and with reference to FIGS. 2, 3A-F and 4A-C, the runtime engine 48 comprises of a Kernel 100 and several component modules 102, 104, 106, 108, 110, 112, 114, 116, 118, 120, 122. Together, these component modules are loaded into a browser 40. Currently available Internet browser software contains an execution engine 130, which generally include a module to process asynchronous HTTP requests, called XMLHttpRequest module 132; and a module to process the HTML document, called DOM API module 134. The desktop agent 42 may comprise several component modules such as administration service 142, application launcher 144 and request broker 146 to access and call WIN32 API layer 150. The Java AWT/Swing Adapter 152 is a special module that is launched along with any Java application 154 that is integrated by an embodiment of the invention.

Figure 3A:
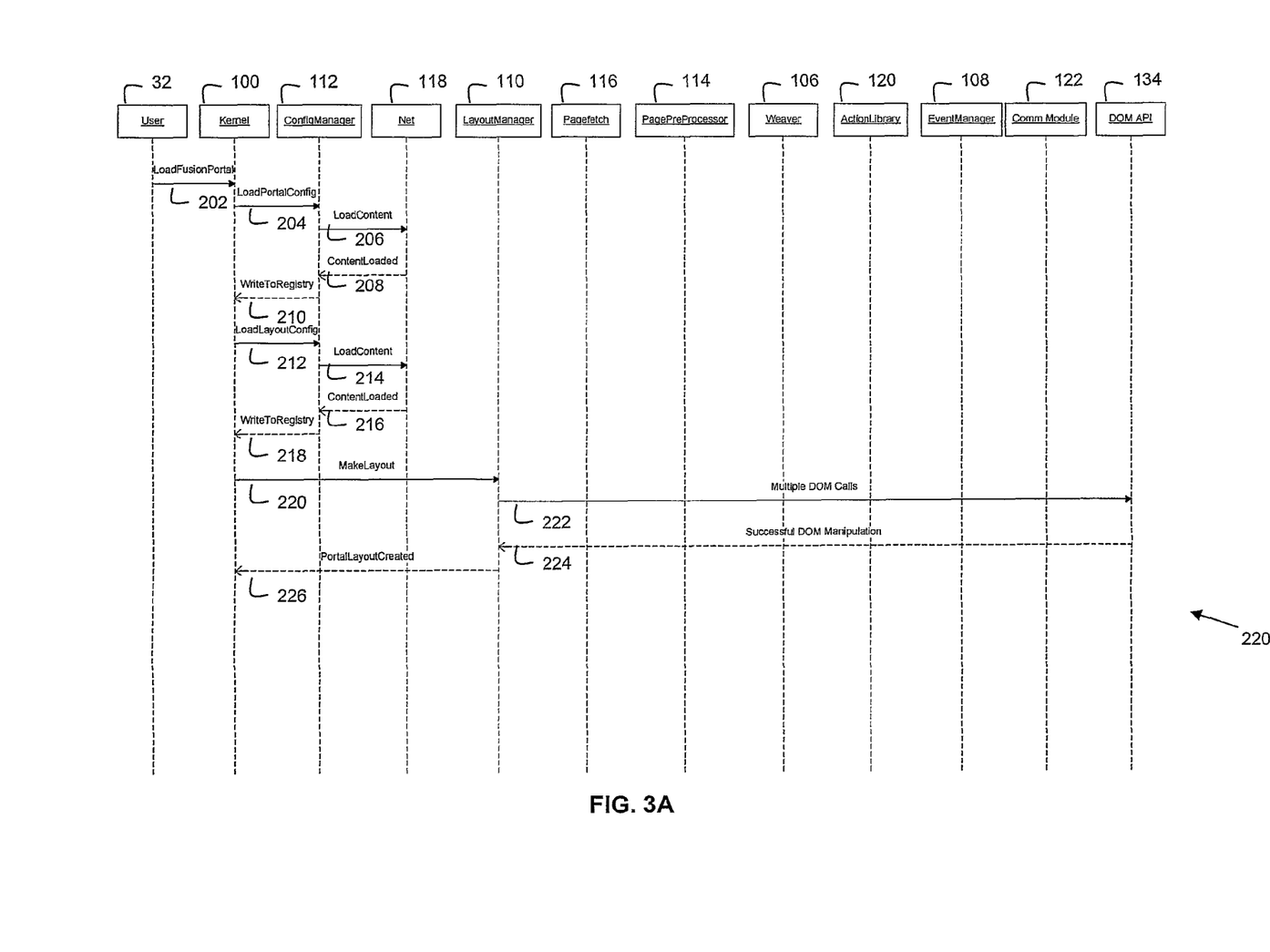
FIG. 3A-G show a set of sequence diagrams of the runtime of the system in accordance with an embodiment of the invention.
Figure 4A:
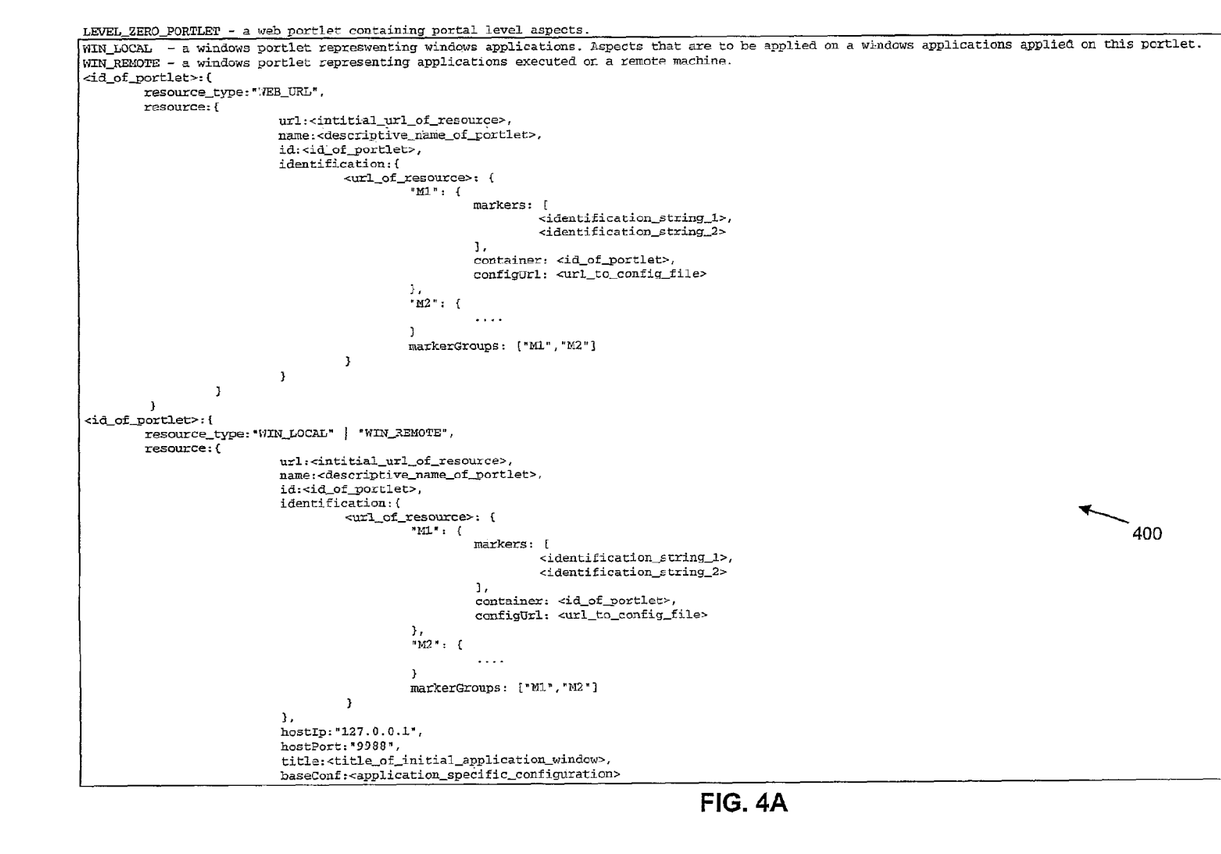
FIG. 4A-C depict the format of the configuration file that defines the portal (FIG. 4A); depicts the format of the configuration file that defines the layout of the portal (FIG. 4B); and depicts the format of the configuration file that defines the modifications to be applied to the specific portlets and the various actions performed in response to events that are generated in the integrated portal (FIG. 4C).

With reference to the runtime sequence process 200 shown in FIG. 3A in accordance with an embodiment of the invention, when loaded 202 into the browser the Kernel calls 204 the Config Manager 112 to load 206 the portal configuration 400, as shown in FIG. 4A. The Config Manager relays 206 this instruction to the Net 118 module. The Net module loads 208 the specified URLs via XMLHttp component 132 of the browser. The Config Manager 112 stores 210 the information obtained into the Registry component 102.

Figure 4B:
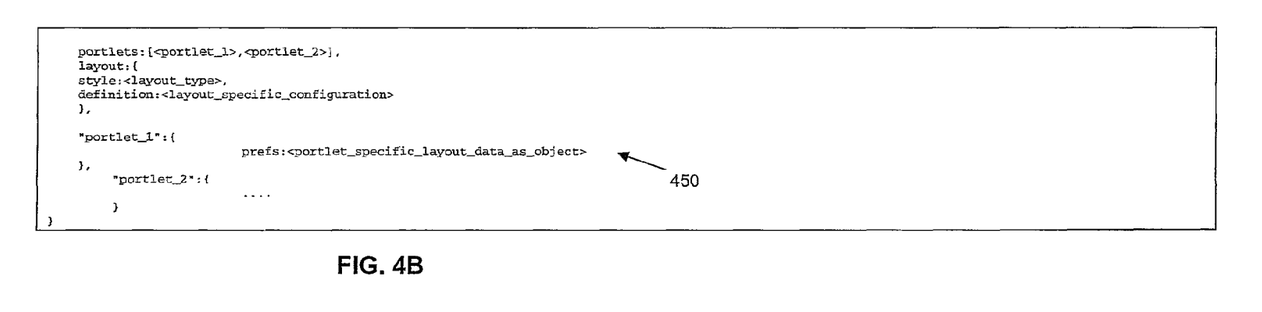

Based on the portal configuration retrieved, the Kernel 100 instructs 212 the Config Manager 112 to load 214 the layout configuration 450, as shown in FIG. 4B. The Config Manager calls 214 the Net module to load 216 the content of the configuration from the network, and write to Registry 218.

The Kernel 100 then instructs 220 the Layout Manager 110 to make the layout of the page as specified in the configuration data. The Layout Manager obtains the configuration information from the Registry component. The Layout Manager then makes multiple calls 222,224 to the browser's DOM API 134 in order to construct 226 a page that conforms to the specified layout. Each portlet resides in a separate HTML iFrame in the main page.

Figure 3B:
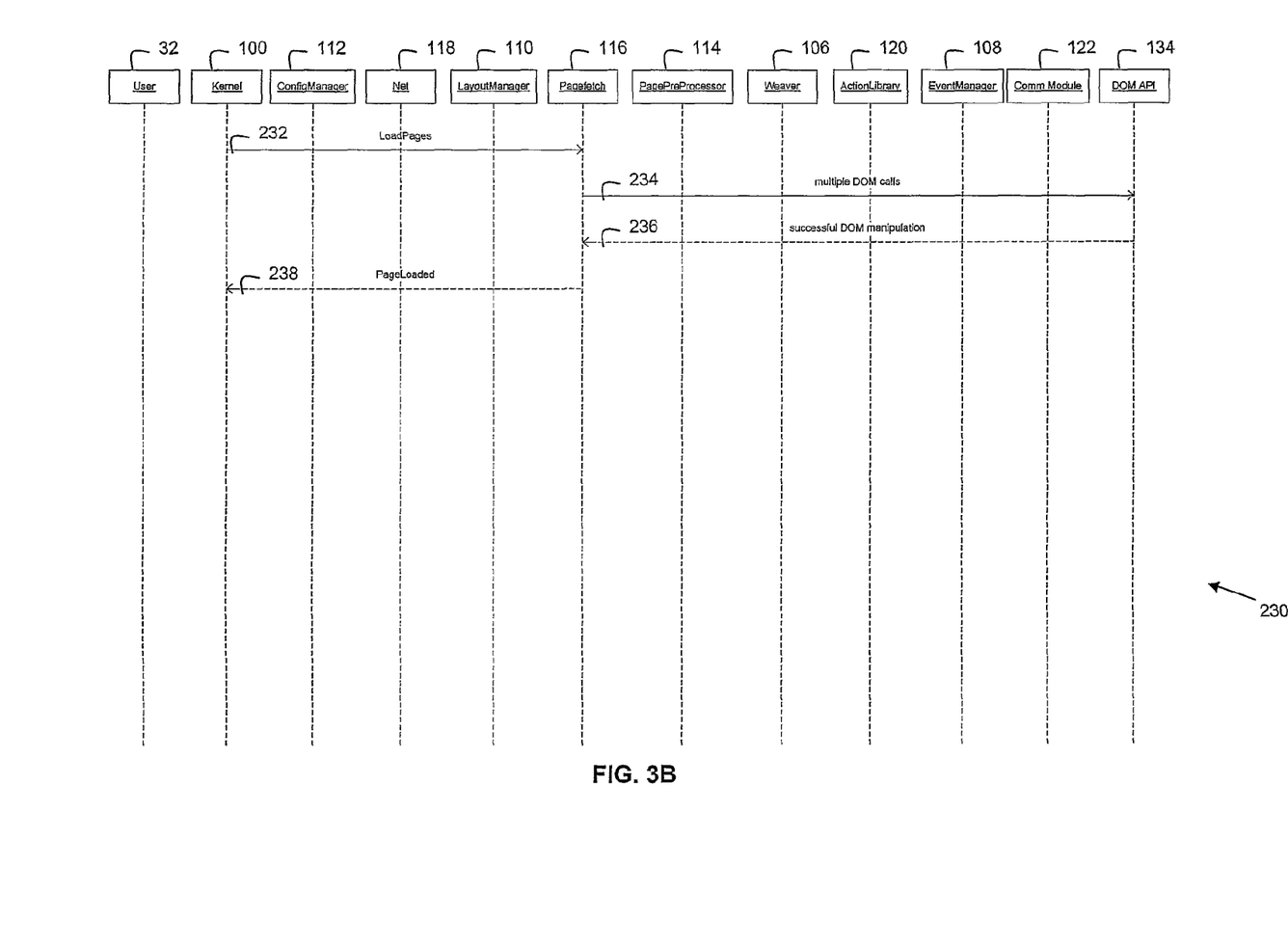

With reference to the runtime sequence process 230 shown in FIG. 3B in accordance with an embodiment of the invention, the Kernel calls the Page Fetch 116 module to load 232 the specified portlet pages into their respective iFrame. The Page Fetch module makes multiple calls 234,236 to the DOM API component in order to load 238 the pages.

Figure 3C:
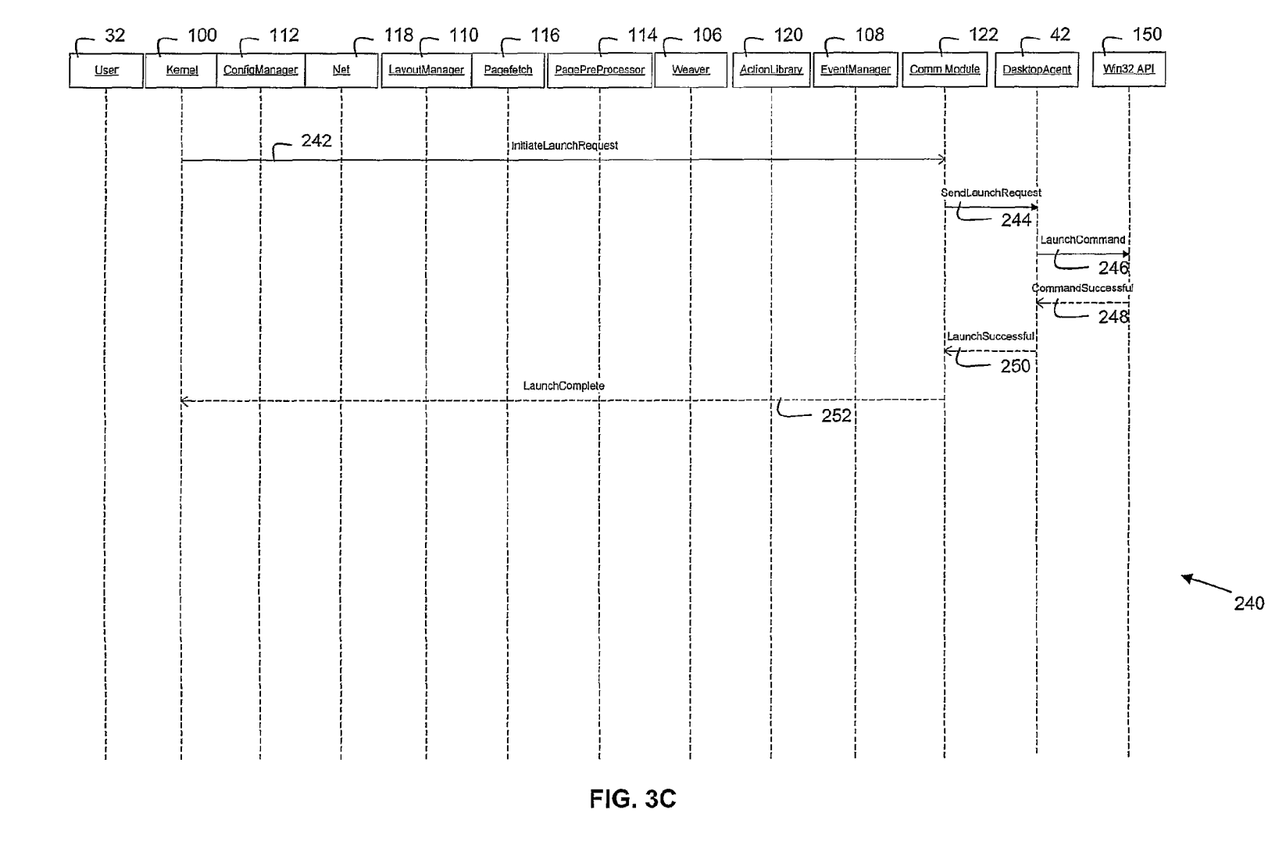

With reference to the runtime sequence process 240 shown in FIG. 3C in accordance with an embodiment of the invention, if the portal configuration specifies any desktop applications to be part of the portal, the Kernel 100 instructs 242 the Communication Module 122 to initiate the launch of the desktop application. The Communication Module sends 244 a launch request to the Desktop Agent 46. The Desktop Agent uses the standard Microsoft Windows API 132 to launch 246 the desktop application. The Win32API 132 returns 248 a response to the Desktop Agent which is relayed back to the Communication Module indicating successful launch 250 of the desktop application. The Communication Module responds 252 back to the Kernel with an indication of successful launch of the desktop application. This process is repeated for all the desktop applications that are specified in the portal configuration.

Figure 3D:
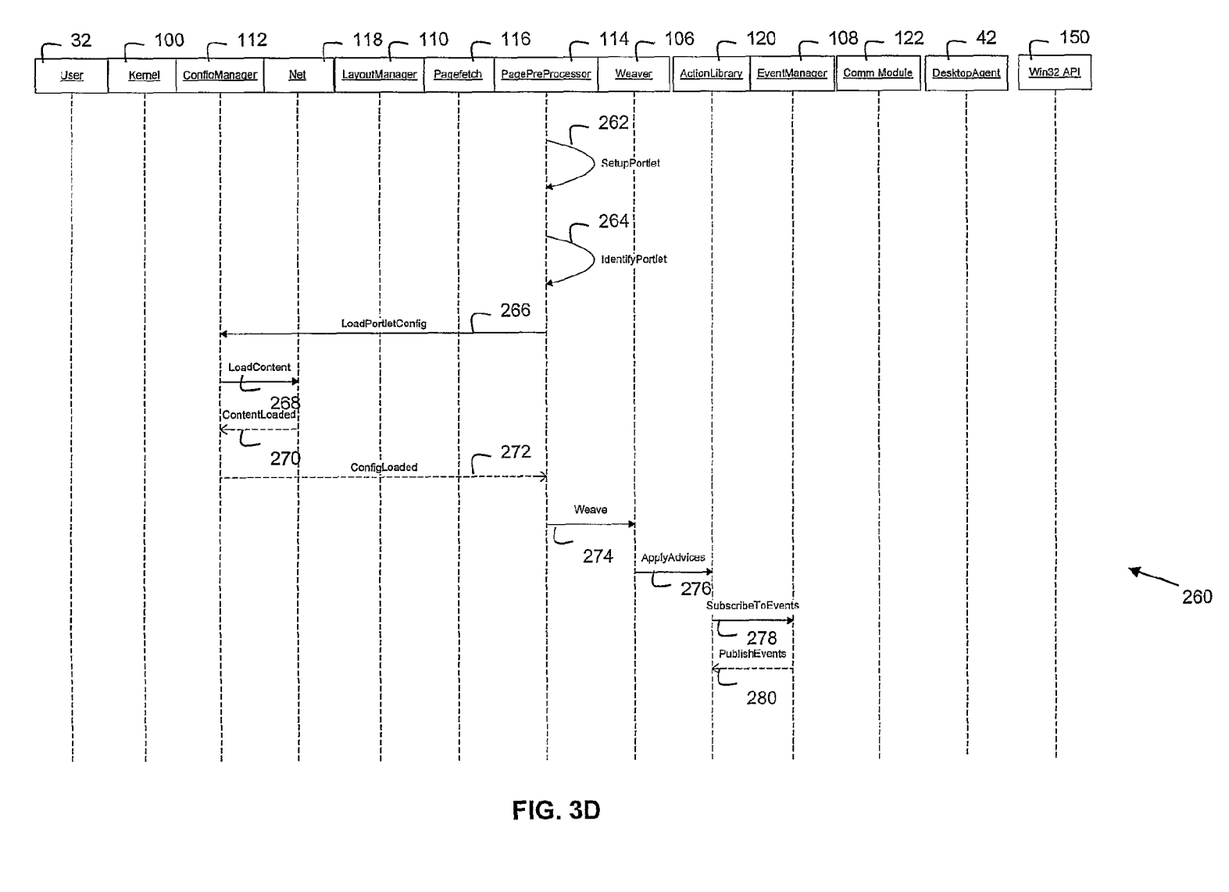

With reference to the runtime sequence process 260 shown in FIG. 3D in accordance with an embodiment of the invention, as web pages are loaded, the web browser engine 130 generates "onload" events, which are handled by the Page Preprocessor 114 component. The Page Preprocessor performs a setup 262 of the portlets and identifies 264 the page that has been loaded. The identification of pages is performed by matching unique strings of text on the page. These identification strings are provided in the portal configuration that has been loaded previously.

Figure 4C:
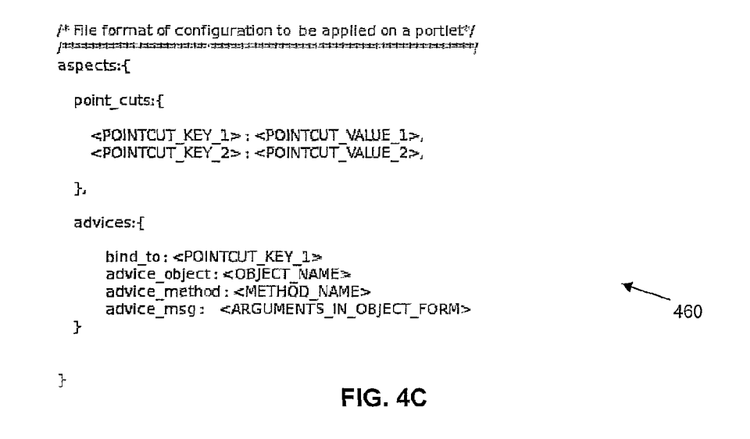

The Page Preprocessor 114 then instructs the Config Manager to load 266 specific configuration for the page, as shown in FIG. 4C that has been currently loaded. FIG. 4C shows the file format 460 of configuration that may be applied on portlets. The Config Manager 112 uses the Net module 118 to relay 268 the command to the XMLHttp module 132 to obtain 270 the page configurations. The page configurations are loaded and sent 272 to Page Preprocessor.

The Page Preprocessor 114 then forwards 274 this configuration to the Weaver 106 component. The Weaver reads the configuration information and parses the current page and calls 276 the Action Library 120 component with the reference of the specific HTML tag element where the behaviour modification is to be made. The Action Library receives this information and sets up the appropriate event handling mechanisms 278,280 with the help of the Event Manager 108 to subscribe to events and publish events.

Events, in the context of this document, are actions that are either initiated by the user, such as mouse click, typing on the keyboard, mouse movement, drag-and-drop etc; or initiated by the application, such as loading of pages, screens, and appearance of visual components in the user interface of the applications.

In the context of this document, configuration of events is the association of specific events with specific event handling routines.

Figure 3E:
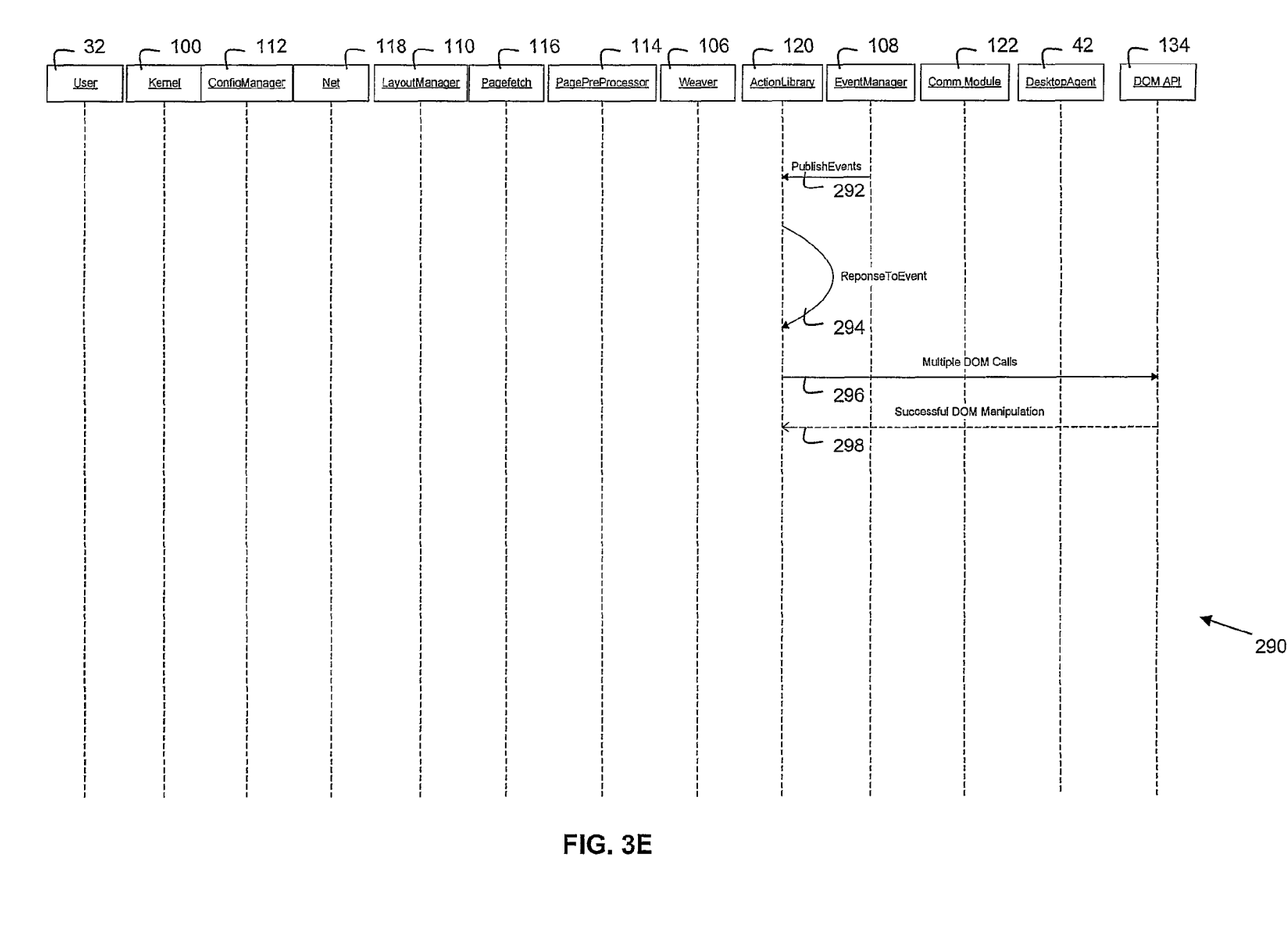

With reference to the runtime sequence process 290 shown in FIG. 3E in accordance with an embodiment of the invention, when a web application related event that has been previously configured occurs, the Event Manager 108 publishes 292 the event to the Action Library 120. The Action Library receives the event notification and in response to event 294 looks up the specified configuration data, as shown in FIG. 4C to obtain the sequence of actions that is to be performed in response to the event. FIG. 4C shows the file format 460 of configurations that may be applied on portlets. The Action Library executes these actions by making multiple calls 296,298 to the DOM API module.

Figure 3F:
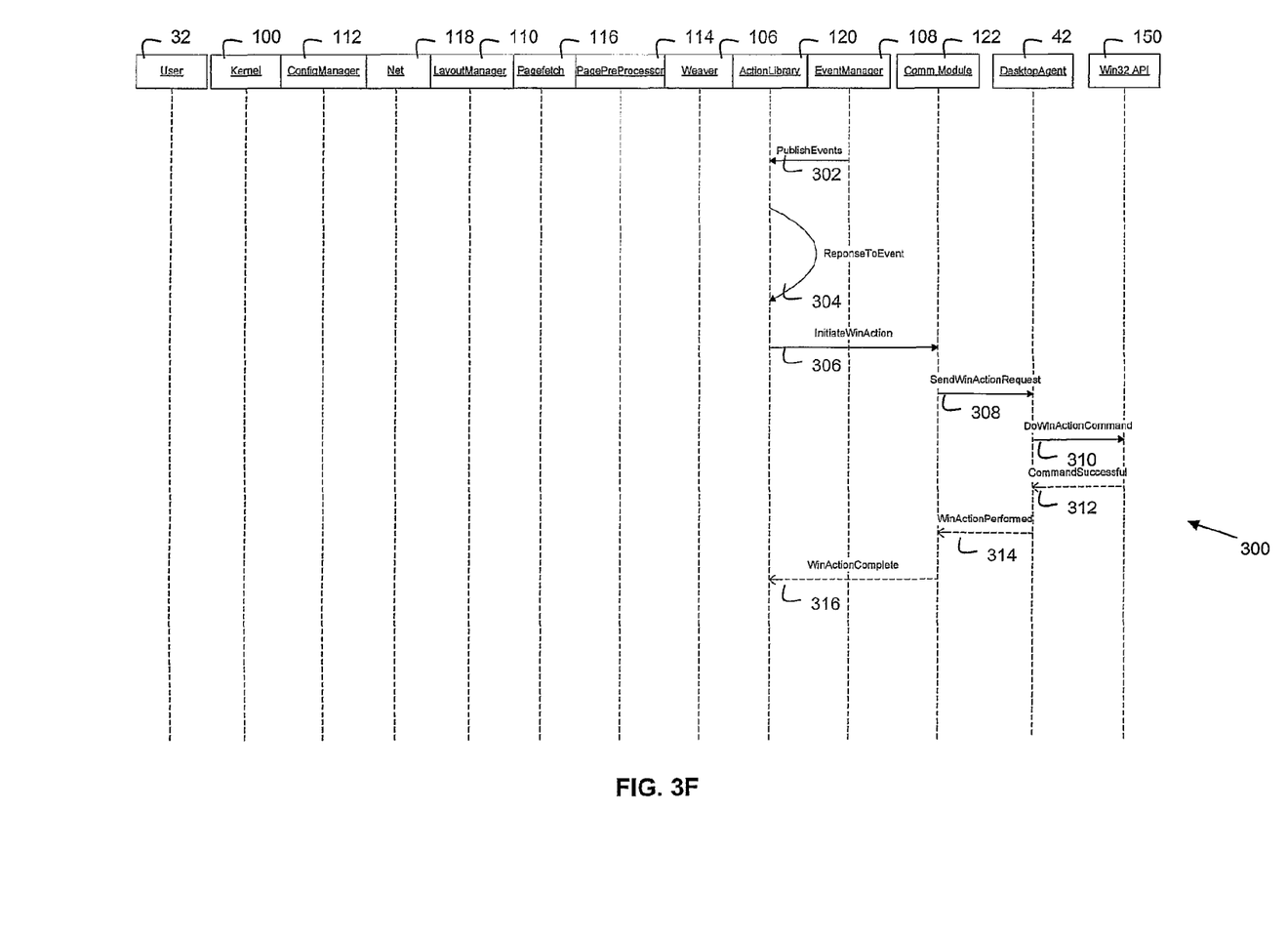

With reference to the runtime sequence process 300 shown in FIG. 3F in accordance with an embodiment of the invention, when a desktop application related event that has been previously configured occurs, the Event Manager publishes 302 the event to the Action Library 120. The Action Library receives the event notification in response to event 304 and looks up the specified configuration data, as shown in FIG. 4C to obtain the sequence of actions that is to be performed in response to the event. FIG. 4C shows the file format 460 of configurations that may be applied on portlets. The Action Library sends 306,308 messages to the Desktop Agent 42 via the Communication Module 122. The Desktop Agent performs 310,312 the required action on the targeted desktop application by using the Win32 API Layer. The Desktop Agent relays 314 the successful completion of the actions to the Communication Module, which relays 316 this to the Action Library.

Figure 3G:
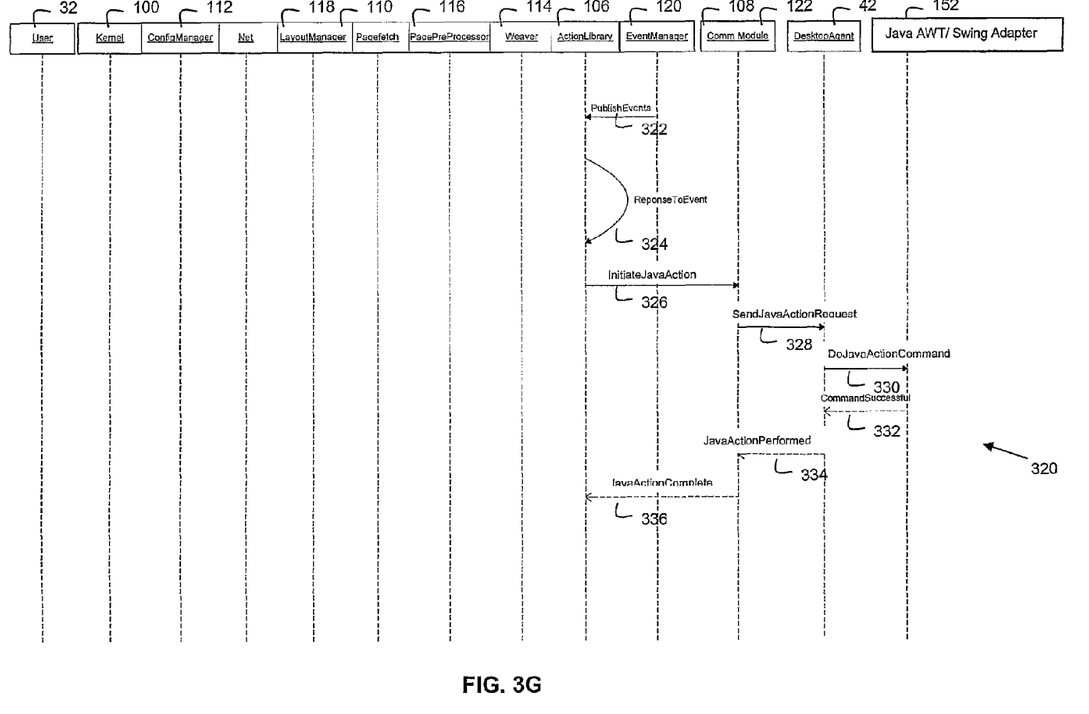

With reference to the runtime sequence process 320 shown in FIG. 3G in accordance with an embodiment of the invention, when a Java-based desktop application related event that has been previously configured occurs, the Event Manager publishes 322 the event to the Action Library 120. The Action Library receives the event notification in response to event 324 and looks up the specified configuration data, as shown in FIG. 4C to obtain the sequence of actions that is to be performed in response to the event. FIG. 4C shows the file format 460 of configurations that may be applied on portlets. The Action Library sends 326,328 messages to the Desktop Agent 42 via the Communication Module 122. The Desktop Agent performs 330,332 the required action on the targeted desktop application by using the Java AWT/Swing Adapter module. The Desktop Agent relays 334 the successful completion of the actions to the Communication Module, which relays 336 this to the Action Library.

At any point during the handling of events, if error conditions are reported to the Action Library, appropriate configurations can be set to instruct the handler to retry the processing. This mechanism adds a reasonable level of robustness and tolerance to this invention.

The devices and subsystems of the exemplary methods and systems described with respect to the figures may communicate, for example, over a communication network, and may include any suitable servers, workstations, PCs, laptop computers, handheld devices, with visual displays and/or monitors, telephones, cellular telephones, wireless devices, PDAs, Internet appliances, set top boxes, modems, other devices, and the like, capable of performing the processes of the disclosed exemplary embodiments. The devices and subsystems, for example, may communicate with each other using any suitable protocol and may be implemented using a general-purpose computer system and the like. One or more interface mechanisms may be employed, for example, including Internet access, telecommunications in any suitable form, such as voice, modem, and the like, wireless communications media, and the like. Accordingly, network 18 may include, for example, wireless communications networks, cellular communications network, Public Switched Telephone Networks (PSTNs), Packet Data Networks (PDNs), the Internet, intranets, hybrid communications networks, combinations thereof, and the like.

It is to be understood that the embodiments, as described with respect to the figures, are for exemplary purposes, as many variations of the specific hardware used to implement the disclosed exemplary embodiments are possible. For example, the functionality of the devices and the subsystems of the embodiments may be implemented via one or more programmed computer system or devices. To implement such variations as well as other variations, a single computer system may be programmed to perform the functions of one or more of the devices and subsystems of the exemplary systems. On the other hand, two or more programmed computer systems or devices may be substituted for any one of the devices and subsystems of the exemplary systems. Accordingly, principles and advantages of distributed processing, such as redundancy, replication, and the like, also may be implemented, as desired, for example, to increase robustness and performance of the exemplary systems described with respect to the figures.

The exemplary systems described with respect to the figures may be used to store information relating to various processes described herein. This information may be stored in one or more memories, such as hard disk, optical disk, magneto-optical disk, RAM, and the like, of the devices and sub-systems of the embodiments. One or more databases of the devices and subsystems may store the information used to implement the exemplary embodiments. The databases may be organized using data structures, such as records, tables, arrays, fields, graphs, trees, lists, and the like, included in one or more memories, such as the memories listed above.

All or a portion of the exemplary systems described with respect to figures may be conveniently implemented using one or more general-purpose computer systems, microprocessors, digital signal processors, micro-controllers, and the like, programmed according to the teachings of the disclosed exemplary embodiments. Appropriate software may be readily prepared by programmers of ordinary skill based on the teachings of the disclosed exemplary embodiments. In addition, the exemplary systems may be implemented by the preparation of application-specific integrated circuits or by interconnecting an appropriate network of component circuits.

It will be appreciated by persons skilled in the art that numerous variations and/or modifications may be made to the invention as shown in the specific embodiments without departing from the scope or spirit of the invention as broadly described.

The present embodiments are, therefore, to be considered in all respects illustrative and not restrictive.

The invention claimed is:

1. A system for integrating and interoperating existing heterogeneous applications, the system comprising:
a developer workstation running an Integrated Development Environment (IDE), the IDE being configured to allow a developer, without creating a new application, to:
select a plurality of existing heterogeneous applications comprising respective visual user interfaces;
define integration points on the visual user interfaces of the existing heterogeneous applications;
define one or more interoperation actions on the defined integration points on the visual user interfaces for a transformation of data and invoking of commands from the defined integration points on the visual user interfaces of a first application selected from the existing heterogeneous applications to the defined integration points on the visual user interfaces of a second application selected from the existing heterogeneous applications; and
generate a configuration file, the configuration file having configuration data based on the selected existing heterogeneous applications, the defined integration points, and the defined interoperation actions; and
a user workstation running a runtime engine, the runtime engine being configured to:
read the configuration data;
launch the selected existing heterogeneous applications; and
use the defined integration points and the defined interoperation actions to integrate and interoperate the selected existing heterogeneous applications without modifying source code of the selected existing heterogeneous applications.

2. The system of claim 1, wherein the configuration data further comprises layout information of an integrated portal wherein the layout information is defined by the developer using a visual interface of the IDE.

3. The system of claim 2 wherein the runtime engine is further configured to:
assemble the integrated portal by using the configuration data to detect and intercept specific web pages as they enter a browser;
alter hypertext markup language (HTML) contents of the specific pages according to the configuration data; and
send the altered HTML to the browser for visual rendering.

4. The system of claim 2 wherein the configuration data further comprises specified transformations defined by the developer using the visual interface of the IDE to:
identify specific pages or screens of the selected existing heterogeneous applications that need to be altered;
specify the type of alterations to be made on each of the specific pages or screens;
specify drag-and-drop actions; and
specify automatic orchestration of actions between the specific pages or screens.

5. The system of claim 4, wherein the configuration data comprises minimum information that is needed by the runtime engine to accurately perform the specified transformations and to integrate and interoperate the selected existing heterogeneous applications.

6. The system of claim 4 wherein the runtime engine is further configured to assemble the integrated portal and perform the specified transformations.

7. The system of claim 6 wherein the runtime engine is further configured to perform the specified transformations in real-time.

8. The system of claim 6 wherein the specified transformations are on Web pages and non-Web applications.

9. The system of claim 1, wherein the user workstation further comprises a desktop agent for receiving requests from the runtime engine, the desktop agent comprising:

an administration service to manage connections to the selected existing heterogeneous applications that are connected to an integrated portal;

a launcher module to launch the selected existing heterogeneous applications when instructed by the runtime engine; and a request broker module that communicates with the selected existing heterogeneous applications by sending messages from the runtime engine and returning responses from the selected existing heterogeneous applications to the runtime engine.

10. The system of claim 1 wherein the user workstation further comprises a desktop agent, wherein the desktop agent is configured to:

listen to requests from the runtime engine;

launch the selected existing heterogeneous applications by invoking an underlying operating system's functionality to launch applications;

connect to the selected existing heterogeneous applications using a messaging layer of the underlying operating system;

relay actions to the selected existing heterogeneous applications using the connection; and relay responses from the selected existing heterogeneous applications back to the runtime engine.

11. The system of claim 1 wherein the runtime engine is activated via a uniform resource locator (URL).

12. The system of claim 1 wherein the developer specifies a location to store the configuration file.

13. The system of claim 12 wherein the location is on a server.

14. The system of claim 1 wherein the running runtime engine is stored in a memory allocated to Web browser.

15. The system of claim 14, wherein the running runtime engine reads the configuration data and performs the defined interoperation actions that are specified in the configuration data.

16. The system of claim 1 wherein the developer workstation and the user workstation are the same workstation.

17. The system of claim 1, further comprising a remote machine capable of communication with the runtime engine, the remote machine comprising a desktop agent, the desktop agent comprising:

an administration service to manage connections to the selected existing heterogeneous applications;

a launcher module to launch the selected existing heterogeneous applications when instructed by the runtime engine; and a request broker module that communicates with the selected existing heterogeneous applications by sending messages from the runtime engine and returning responses from the selected existing heterogeneous applications to the runtime engine.

18. The system of claim 1, further comprising a remote machine capable of communication with the runtime engine, the remote machine comprising a desktop agent, wherein the desktop agent is configured to:

listen to requests from the runtime engine;

launch the selected existing heterogeneous applications by invoking an underlying operating system's functionality to launch applications;

connect to the selected existing heterogeneous applications using a messaging layer of the underlying operating system;

relay actions to the selected existing heterogeneous applications using the connection; and relay responses from the selected existing heterogeneous applications back to the runtime engine.

19. The system of claim 1 wherein the first application and the second application are different.

20. A method for integrating and interoperating existing heterogeneous applications, the method comprising:

providing an Integrated Development Environment (IDE) configured to allow a developer, without creating a new application, to:

select a plurality of existing heterogeneous applications comprising respective visual user interfaces;

define integration points on the visual user interfaces of the existing heterogeneous applications;

define one or more interoperation actions on the defined integration points on the visual user interfaces for a transformation of data and invoking of commands from the defined integration points on the visual user interfaces of a first application selected from the existing heterogeneous applications to the defined integration points on the visual user interfaces of a second application selected from the existing heterogeneous applications;

generate a configuration file, the configuration file having configuration data based on the selected existing heterogeneous applications, the defined integration points, and the defined interoperation actions; and providing a runtime engine configured to read the configuration data to launch the selected existing heterogeneous applications and use the defined integration points and the defined interoperation actions to integrate and interoperate the selected existing heterogeneous applications without modifying source code of the selected existing heterogeneous applications.

21. The method of claim 20, further comprising the step of executing the runtime engine wherein executing the runtime engine further comprises the steps of:

parsing the configuration file and loading the configuration file into a browser;

creating an integrated portal;

using the configuration data to detect and intercept specific web pages as they enter the browser;

altering hypertext markup language (HTML) contents of the specific web pages according to the configuration data; and sending the altered HTML to the browser for visual rendering.

22. The method of claim 20 further comprising the step of executing a desktop agent wherein executing the desktop agent comprises:

listening to requests from the runtime engine;

launching the selected existing heterogeneous applications by invoking an underlying operating system's functionality to launch applications;

connecting to the selected existing heterogeneous applications using a messaging layer of the underlying operating system, relaying actions to the selected existing heterogeneous applications; and relaying responses from the selected existing heterogeneous applications back to the runtime engine.

23. The method of claim 22 wherein the desktop agent resides on a remote machine, accessible via a network; and application level protocols.

24. The method of claim 20 further comprising the steps of displaying the visual user interfaces on a workstation having a display device that is being operated by a user.

25. The method of claim 20, further comprising the step of displaying the visual user interfaces on a workstation having a display device.

26. The method of claim 20 wherein the first application and the second application are different.

27. A computer program product installed on a developer workstation, the computer program product for integrating and interoperating existing heterogeneous applications, the computer program product, when executed, provides an Integrated Development Environment (IDE) being configured to allow a developer, without creating a new application, to:

select a plurality of existing heterogeneous applications comprising respective visual user interfaces;

define integration points on the visual user interfaces of the existing heterogeneous applications;

define one or more interoperation actions on the defined integration points on the visual user interfaces for a transformation of data and invoking of commands from the defined integration points on the visual user interfaces of a first application selected from the existing heterogeneous applications to the defined integration points on the visual user interfaces of a second application selected from the existing heterogeneous applications;

generate a configuration file, the configuration file having configuration data based on the selected existing heterogeneous applications, the defined integration points, and the defined interoperation actions;

provide a runtime engine configured to:

read the configuration data to launch the selected existing heterogeneous applications; and use the defined integration points and the defined interoperation actions to integrate and interoperate the selected existing heterogeneous applications without modifying source code of the selected existing heterogeneous applications.

28. The computer program product of claim 27 wherein the first application and the second application are different.

* * * * *